Aug. 1, 1933.  G. V. SWEARINGEN ET AL  1,920,534
CORROSION RESISTANT LINING FOR CRACKING APPARATUS
Filed May 19, 1930

G. V. Swearingen
E. S. Dixon
INVENTORS

BY R. J. Dearborn
ATTORNEY

Patented Aug. 1, 1933

1,920,534

UNITED STATES PATENT OFFICE 1,920,534

CORROSION RESISTANT LINING FOR CRACKING APPARATUS

Garrett V. Swearingen and Enslo S. Dixon, Port Arthur, Tex., assignors to The Texas Company, New York, N. Y., a Corporation of Delaware Application May 19, 1930. Serial No. 453,484

11 Claims. (Cl. 219—10)

This invention relates to corrosion resistant lining for apparatus adapted to cracking hydrocarbon oils and refers more particularly to lining conduits, flow lines, flared nipples and the like with a material which is resistant to the action of corrosive compounds present in the oil undergoing treatment.

In the cracking of hydrocarbon oil, especially oil having a high sulphur content, certain corrosive compounds may be evolved which are extremely corrosive to ordinary steel such as is usually employed in the construction of cracking apparatus such as stills, conduits, flow lines, or connecting nipples. These sulphur compounds, particularly hydrogen sulphide, react exceedingly rapidly with ordinary steel at the elevated temperatures generally employed in conventional cracking operations, thereby necessitating frequent replacement of expansive equipment and apparatus.

The present invention broadly contemplates improved means of protecting portions of cracking equipment such as vapor and liquid chambers or conduits, ball-joint nipples and the like, which are subject to rapid deterioration through the action of corrosive sulphur compounds by inserting therein a lining formed from comparatively thin sheet metal or alloy resistant to sulphur corrosion, and then bonding the ends of the lining to adjacent portions of the conduit or nipple by building up thereon a fusion welded deposit whose upper and exposed portion may be of substantially the same composition as the inserted lining forming a protective covering for the portions of the conduit or nipple adjacent the inserted lining, and thereby forming an impervious protective covering of uniform composition over the entire portion of the conduit which would othrewise be exposed to contact with corrosive compounds.

An important aspect of our invention comprises protecting the flared portions of nipples adapted to form ball joint connections with other nipples or parts of the apparatus, by a deposit, preferably comprising two or more layers of corrosion resisting metal which is built up on the flared portion of the nipple by fusion welding, preferably with an electric arc, to form a corrosion resisting lining or facing of substantially the same thickness as the liner within the unflared portion of the nipple. The surface of the metallic facing or lining formed on the flared portion of the nipple may be subsequently smoothed off or ball-joined by grinding or machining to render it smooth and suitable to form a fluid-tight joint, the exposed surface of which is resistant to the action of corrosive sulphur compounds contained in the oil and coming in contact therewith.

The deposited corrosion resisting metal overlying the ends of the conduit or nipple and forming a fused bond between the conduit and the adjacent portions of the lining serve to prevent fluid from entering the space between the liner and the inner surface of the conduit thereby avoiding any possible deleterious effect upon the metal behind the liner.

Suitable linings may be formed from sheets of stainless steel or metal having a chromium content ranging from 4 to 18 percent while the built up and fused portions may be deposited from welding rods or electrodes composed of substantially similar corrosion resisting metal, preferably covered with fluxing material, and which are readily available in the industry.

Ordinarily we prefer to use linings fabricated from steel containing 12 to 14 percent chromium since such steel possesses sufficiently high resistivity towards sulphur corrosion while its coefficient of expansion is not excessively greater than that of ordinary steel as may be the case with higher chrome steels.

In order to prevent warping or buckling of the lining during service the lining may be bonded to the inner and contiguous surface of the conduit by fusion welded bonds of corrosion resisting metal deposited in successive layers in perforations previously formed in the lining. In relatively small nipples or pipe sections the fusion welded bond built up on the ends thereof usually serves to form sufficient bonding between the lining and the outer portion of the nipple, so that in such cases an imperforate lining may be employed.

We have found that it is not possible to satisfactorily bond high chromium steel parts to contiguous portions of a carbon steel conduit or vessel by the ordinary methods of arc or fusion welding which is well known in the art since the bonds resulting from this procedure tend to be porous and may be of uneven composition due to the presence of varying proportions of carbon steel which have been fused and incorporated in the bonds.

In the usual welding procedure where metals of substantially similar nature are fused together the work or portion of apparatus on which metal is deposited from a welding rod or bar is usually connected to the positive side of a direct current electrical welding circuit while the welding rod or bar is connected to the negative side of the circuit, in which case the portion of the apparatus positively connected to the welding circuit is subjected to considerable heating so that a substantial pool or puddle of molten metal is maintained thereon into which metal melting from the welding rod is continuously deposited.

When this procedure is followed in bonding high chrome steel parts to ordinary carbon steel, using a welding rod consisting of high chrome steel, the resulting bead or deposit forming the bond comprises a predominant portion of carbon steel because the proportion of welding rod metal deposited may be relatively small compared to the amount of carbon steel maintained in a molten state and with which it is fused, thereby rendering the resulting bond substantially non-resistant to sulphur corrosion.

We have overcome this difficulty by reversing the polarity of the direct current welding circuit, that is, connecting the welding rod to the positive side of the circuit and the work to the negative side of the circuit. By so doing the portion of carbon steel apparatus upon which the chrome alloy steel is deposited is maintained at an appreciably lower temperature than when the usual welding circuit polarity is employed so that a relatively smaller amount of the carbon steel is maintained in a molten state thereby resulting in a bead or bond which may contain a relatively small proportion of the carbon steel. The resulting bond, while comprising a predominant proportion of chrome alloy welding rod metal and therefore substantially resistant to sulphur corrosion, is sufficiently well fused with the carbon steel to effect a strong, ductile and enduring bond between the chrome steel and carbon steel parts which are being bonded together.

Furthermore we prefer to deposit the welding rod metal in several successive and relatively thin layers or laminations, each layer or lamination imposed upon and bonded by fusing with the preceding and lower layer. Thus while the first layer may contain a substantial proportion of carbon steel the second or subsequent layers of deposited metal will be of substantially the same composition as that of the welding rod itself, which may be similar in composition to the inserted lining or may have a somewhat higher content of chromium so that this upper portion of the bond is therefore completely resistant to sulphur corrosion.

Usually a bond composed of two layers of metal deposited in this manner is sufficient since the second and upper layer is sufficiently resistant to corrosion. For the protection of flared portions of nipples, which are to be subsequently ball-jointed, three layers of metal are usually preferred so that after ball-jointing, the deposited metal is of substantially the same thickness as the liner inserted in the remainder or unflared portion of the nipple.

The invention may be readily understood from the following discussion in connection with the figures of the accompanying drawing illustrating the invention.

Figure 1:
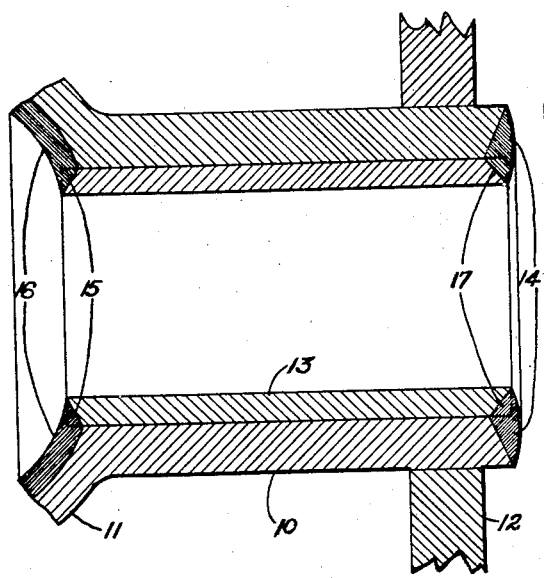
Figure 1 is a sectional view taken along the axis of a flared nipple having an imperforate liner bonded thereto by a deposit of metal built up on the plain end and over the flared portion of the nipple.

Referring to Figure 1, a steel nipple 10 having a flared portion 11 has its unflared end projected through a hole provided in a wall 12 of a vessel or other piece of apparatus such as may be employed in cracking hydrocarbon oils and is secured therein, preferably by welding with an electric arc in the conventional manner.

A tubular lining 13 formed from a relatively thin sheet of stainless steel or chromium alloy is inserted within the nipple 10.

The end of the lining adjacent to the flared portion of the nipple is projected a short distance beyond the inner rim or edge of the flared portion of the nipple to form with the inner face of the flare a circular trough or groove into which a deposit 16 of corrosion resisting metal is built up, preferably in successive layers as already described, by fusion welding, to an even depth extending completely over the inner face of the flare. The deposited metal fuses with the portion 15 of the projected end of the liner, shown in dotted lines, and also penetrates and fuses with the inner steel surface of the flare 11 affording a solid fused joint therebetween as well as forming an impervious corrosion resisting covering overlying the face of the flare and whose surface may subsequently be ball-jointed.

The plain and unflared end of the nipple is chamfered by cutting away its inner edge to thereby form with the adjacent portion 17 of the projecting end of the lining, shown in dotted lines, a trough or groove into which the bonding metal is deposited in a manner similar to that employed in building up the flared portion of the nipple to form a protective facing 14 overlying the end of the nipple and bonding the lining thereto.

In lining relatively small conduits or pipes having diameters not in excess of 6 inches, and of relatively short length, it is usually unnecessary to bond the liner to the surrounding conduit or pipe at points intermediate the ends thereof since fusing and bonding at the ends only is sufficient to hold the liner in position and prevent it from warping or being distorted while in service.

In larger conduits or vessels it is desirable, however, to bond the lining to the surrounding wall of the apparatus at frequent intervals in some suitable manner in order to prevent any tendency of the lining towards buckling or warping due to variations in temperature conditions which may prevail in cracking operations.

Figure 2:
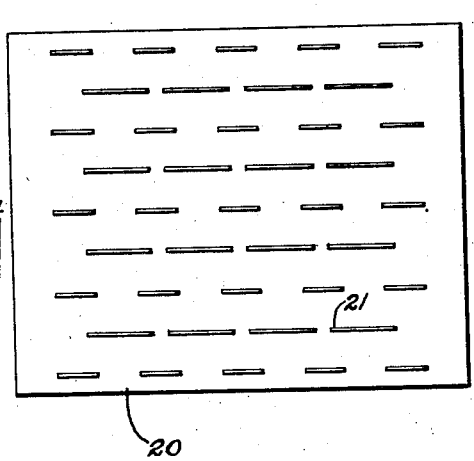
Figure 2 illustrates a perforated sheet of corrosion resisting metal prior to forming and inserting in a conduit.
Figure 4:
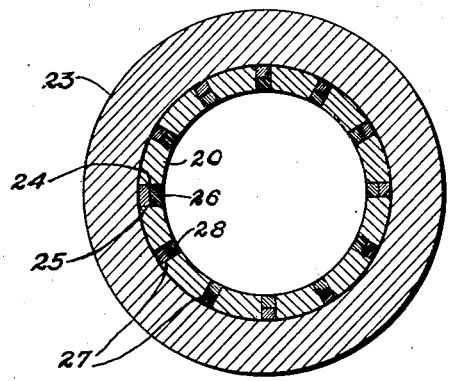
Figure 4 is a cross-sectional view taken on the line 2—2 of Figure 3.
Figure 3:
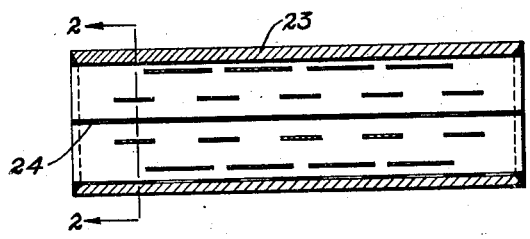
Figure 3 is a sectional view taken along the axis of a conduit with the perforated liner illustrated in Fig. 2 inserted.

Referring to Figures 2, 3, and 4, number 20 is a thin sheet of corrosion resisting metal from which a lining for a conduit 23 is formed having a plurality of rectangular shaped perforations 21 arranged in parallel rows, the perforations in one row offset or staggered with respect to those in an adjacent row.

While the number and dimensions as well as the shape of the perforations may be varied as desired we usually employ perforations such as may be formed by a circular saw making cuts about one quarter inch in width, from 2 to 4 inches apart and whose length may range from 4 to 6 inches or even more, while the rows of such cuts may be spaced from 4 to 6 inches apart.

The perforated sheet is of such width that upon rolling into shape and inserting in the conduit its longitudinal edges fail to meet by a space of approximately one quarter inch in width forming a long narrow channel 24 into which a primary layer 25 of chrome steel or corrosion resistant bonding metal is deposited after the liner is inserted to form a seam therein which fuses with the edges of the lining and also with the adjoining portion of the conduit. A second and upper layer 26 of bonding metal is then deposited in the channel to fuse with the adjoining edges of the lining and with the first layer to form a complete seam whose exposed portion is of substantially the same high chromium content as the stainless steel from which the liner is formed and therefore resistant to attack from corrosive sulphur compounds.

In a similar manner chrome steel bonding metal is deposited in each rectangular slot or perforation to form a plurality of bonding points between the liner and the conduit, each bond comprising preferably a primary layer 27 and a secondary or exposed layer 28 which is uncontaminated with carbon steel from which the outer portion of the conduit 23 may be fabricated.

While we ordinarily employ metallic arc welding in forming fusion welded bonds in the manner described above, we do not desire to limit ourselves to any particular type of fusion welding.

Obviously many modifications and variations of the invention, as hereinbefore set forth, may be made without departing from the spirit and scope thereof, and therefore, only such limitations should be imposed as are indicated in the appended claims.

We claim:

1. The method of protecting a vessel or conduit which comprises inserting therein a lining formed from relatively thin corrosion resisting metal, joining the lining to the vessel or conduit with bonds composed of a plurality of layers of corrosion resisting metal successively super-imposed by fusion welding upon the ends of said vessel or conduit and forming a protective covering therefor.

2. The method of protecting a conduit which comprises inserting therein a perforated lining formed from relatively thin corrosion resisting metal, and joining the lining to the conduit with bonds composed of a plurality of layers of corrosion resisting metal successively super-imposed by fusion welding within the perforations and upon the ends of the conduit and forming a protective covering for the perforations and the ends of said conduit.

3. The method of forming a non-corrosive welded bond between adjacent edges of a vessel or conduit and a non-corrosive liner therefor, which comprises depositing a non-corrosive welding rod material in the joint between said adjacent edges in several successive and relatively thin layers, each layer being imposed upon and bonded by fusing with the preceding or lower layer and progressively decreasing the amount of metal of the vessel present in each layer until the upper layer is substantially entirely of the non-corrosive welding rod.

4. The method of forming a non-corrosive welded bond between adjacent edges of a vessel and a non-corrosive liner therefor, which comprises applying by means of fusion welding a succession of thin deposited layers of non-corrosive material, each successive layer being composed of a larger proportion of the deposited material and less of the underlying material, so that the final layer consists substantially entirely of the non-corrosive material.

5. The method of protecting conduits which comprises inserting in the conduit a liner of non-corrosive material and forming fusion welded bonds of non-corrosive material between the ends of the liner and the adjacent ends of the conduit, said bonds being formed by applying the deposited metal in successive thin layers so that the upper exposed layer will be substantially free of the material of which the conduit is made and will form with the liner, a substantially continuous surface of non-corrosive material over the inner walls and ends of the conduit.

6. In combination with a vessel, an inner lining having perforations and formed from corrosion resisting metal disposed within the vessel, and bonds securing the lining to the interior of the vessel formed of a plurality of thin layers of corrosion resisting metal successively imposed by fusion welding within the perforation, the layer immediately adjacent the vessel consisting of the metals of the vessel and the welding metal, and the top layer substantially only of the corrosion resistant welding metal.

7. In combination with a vessel, an inner lining having perforations and formed from corrosion resisting metal disposed within the vessel, and bonds securing the lining to the interior of the vessel formed of a plurality of thin layers of corrosion resisting metal successively imposed by fusion welding within the perforation and between the adjacent edges of the liner and the vessel to provide a continuous surface within the vessel resistant to corrosive substances, the layer immediately adjacent the vessel consisting of the metals of the vessel and the welding metal, and the top layer substantially only of the corrosion resistant welding metal.

8. The method of protecting the interior of metallic vessels from corrosive substances which comprises inserting within the vessel a lining formed from a corrosion resistant metal, securing the lining to the vessel by fusion welded bonds of corrosion resisting metal built up of a plurality of thin layers applied so that the layer immediately adjacent the vessel consists of the metals of the vessel, and the corrosion resistant welding metal, and the top layer substantially only of the corrosion resistant metal forming the welding metal.

9. The method of protecting the interior of metallic vessels from corrosive substances which comprises inserting within the vessel a lining formed from a chromium alloy, securing the lining to the vessel by fusion welded bonds of an alloy of chromium built up of a plurality of thin layers and applied so that the layer immediately adjacent the vessel consists of the metals of the vessel and the chromium alloy welding metal and the top layer substantially only of the chromium alloy forming the welding metal.

10. The method of protecting the interior of metallic vessels from corrosive substances which comprises inserting within the vessel a lining formed from a corrosive resistant metal and having a plurality of perforations therein, securing the lining to the vessel by fusion welded bonds of corrosion resistant metal built up of a plurality of thin layers within the perforations, and applied so that the layer immediately adjacent the vessel consists of the metals of the vessel and the welding metal, and the top layer substantially only of the corrosion resistant metal.

11. The method of protecting the interior of metallic vessels from corrosive substances which comprises inserting within the vessel a lining formed from a corrosion resistant metal, securing the lining to the vessel by fusion welded bonds of corrosion resistant metal built up of a plurality of thin layers, depositing a non-corrosion welding rod material between the adjacent edges of the liner and the vessel in a plurality of thin layers to provide a continuous surface within the vessel resistant to corrosive substances, the layer of corrosion resistant welding metal immediately adjacent the vessel consisting of the metals of the vessel and the corrosion resistant welding metal and top layer substantially only of the corrosion resistant welding metal.

GARRETT V. SWEARINGEN.
ENSLO S. DIXON.